(12) United States Patent
Jeong

(10) Patent No.: US 7,593,310 B2
(45) Date of Patent: Sep. 22, 2009

(54) METHOD FOR MANUFACTURING MULTILAYERED DISK

(75) Inventor: Seong-Yun Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 458 days.

(21) Appl. No.: 11/405,609

(22) Filed: Apr. 18, 2006

(65) Prior Publication Data

US 2006/0256704 A1 Nov. 16, 2006

(30) Foreign Application Priority Data

Apr. 20, 2005 (KR) .................. 10-2005-0032873

(51) Int. Cl.
*G11B 7/24* (2006.01)
(52) U.S. Cl. .................................. 369/275.1
(58) Field of Classification Search ........................ None
See application file for complete search history.

(56) References Cited

U.S. PATENT DOCUMENTS

| | | | |
|---|---|---|---|
| 6,432,502 B1 * | 8/2002 | Kitaura et al. ............. 428/64.1 |
| 7,136,349 B2 * | 11/2006 | Nishiuchi et al. ......... 369/275.4 |
| 2002/0036979 A1 * | 3/2002 | Hayashida et al. .......... 369/286 |
| 2003/0076769 A1 * | 4/2003 | Kim et al. .............. 369/112.26 |
| 2004/0223445 A1 * | 11/2004 | Nishiuchi et al. ........... 369/120 |
| 2005/0084800 A1 * | 4/2005 | Tawa .................... 430/270.11 |
| 2007/0070825 A1 * | 3/2007 | Kim et al. ................ 369/13.28 |

* cited by examiner

*Primary Examiner*—Joseph H Feild
*Assistant Examiner*—Henok G Heyi
(74) *Attorney, Agent, or Firm*—Birch, Stewart, Kolasch & Birch, LLP

(57) ABSTRACT

The present invention relates to a method of manufacturing a multilayered disk capable of refraining from an interference at the adjacent layer when a specific layer of the multilayered layers is recorded or regenerated in an optical disk. According to the present invention, a method for manufacturing a multilayered disk having at least two recording layers is characterized by that a space between the two recoding layers is set to less than 10 μm to refrain from an interference at the adjacent layer when one of the recording layers is recorded or regenerated. According to a method for manufacturing a multilayered disk and a method for removing an interlayer interference using the disk in the present invention, it is possible to design and manufacture a multilayered disk within a reflective signal range.

12 Claims, 3 Drawing Sheets

METHOD FOR MANUFACTURING MULTILAYERED DISK

BACKGROUND OF THE INVENTION

1. Field of the Invention

The present invention relates to a method of manufacturing a multilayered disk capable of refraining from an interlayer interference between adjacent layers when a specific layer of the multilayered layers is recorded or regenerated in an optical disk.

2. Background of the Related Art

As a request for high quality moving pictures is increased in accordance with an improvement of consumers' lifestyle along with a speed doubling and an increase of storing density of an optical storing device, a larger volume of storing data of an optical storing disk is required.

FIG. 1 is a schematic block diagram of a general optical pickup device.

Referring to FIG. 1, the optical pickup device comprises a laser diode 101 emitting a beam with a regular wavelength, a beam splitter 102 reflecting or transmitting the beam, a collimator lens 103 emitting the beam impinged from the beam splitter 102 into a parallelized beam, an object lens 104 condensing the beam impinged from the collimator lens 103 to the optical disk 105 and transmitting the reflected beam to the collimator lens 103 and a photo detector 106 detecting the beam reflected by the beam splitter 102 and emitting it as an electric signal.

The above configured optical pickup device is shown in FIG. 1. As shown in FIG. 1, a laser beam emitted from the laser diode LD 101 is transmitted through the beam splitter 102 and the transmitted beam is impinged to an object lens 104 from the collimator lens 103 as a parallel beam. The object lens 104 condenses an impinged beam to a point on the optical disk 105 to record and regenerate the information, and a beam formed from the optical disk 105 is reflected. The reflected beam is transmitted through the object lens 104 and the collimator lens 103 to be reflected to the photo detector 106 by the beam splitter 102. The photo detector 106 changes the information which is reflected and input into an electric signal.

In a recent optical system, a lot of methods are attempted in order to increase a recording volume of an optical disk. A representative method is to increase a recording density by decreasing the size of a light condensed on a disk. The object can be obtained by decreasing a wavelength of a laser and increasing a numerical aperture of the object lens for condensing a light.

The recently developed recording and regenerating device of an optical disk for Blu-ray Disk BD employs a laser wavelength of 450 nm and a numerical aperture of the object lens of 0.85 to have a recording volume of 25 GB per one disk of 12 cm.

In addition, researches on a method using a UV laser with a shorter wavelength or a method for recording a near field for further widening a numerical aperture of an object lens have been carried out in order to further increase a recording volume.

As another method for increasing the total recording volume in the process, the number of recording layers is increased by making the recording layer of an optical disk have multiple layers, with maintaining the two dimensional recording densities.

FIG. 2 schematically shows a Blu-ray disk where the dual layers are formed and a pickup device thereof.

Referring to FIG. 2, the Blu-ray disk 30 is formed to have two recording layers 1 and 2 with a predetermined distance d2 therebetween. The recording layer 1 is formed in the same direction of the object lens 11 of an optical pickup with a predetermined distance d1.

An optical disk device for reading or recording the recorded data onto a recording layer of the Blu-ray disk 30 is variably controlled to be suitable for recording or regenerating a laser power of a laser diode LD 13 included in the pickup. For example, the optical pickup performs the operations of recording or regenerating by transforming a light source emitted from the laser diode 13 into a parallelized light in the collimator lens CL 12, and condensing the parallelized light on the recording layer of a disk in the object lens OL 11 and reflecting it again.

As described above, in the case of DVD or BD disks, a method for increasing a recording volume using two layers has been already completed, and a method for increasing a recording layer of a BD disk to have six or eight layers or further is developed.

However, the most serious problem of the above described multilayered disk is that a light reflected from an undesired layer is received to a photo detector to operate as a noise when a laser light is condensed on a layer to be recorded or regenerated. Thus, it is required to adjust a shape of a photo detector and a range of a reflective signal or S-curve range and so on in order to decrease the noise.

SUMMARY OF THE INVENTION

An object of the present invention is to provide with a method for removing an interlayer interference in an optical pickup device where noise characteristics of all signals can be decreased by adjusting the range of a reflective signal. In the device, the disk recording layers has a regular space in order to decrease an interlayer interference in the multilayered disk.

In order achieve the above object, a method for manufacturing a multilayered disk according to the present invention is characterized by that a space between the recoding layers is set to less than 10 µm to refrain from an interference at the adjacent layer when one of the recording layers is recorded or regenerated.

It is preferable that the space between the recording layers of the disk be the same.

It is preferable that the range of a reflective signal from the recording layer of the disk be less than 1.7 µm.

It is preferable that the reflective signal be detected using an astigmatism method that a focus server is used to pick up a light.

It is preferable that the method for detecting the reflective signal use a focus server to pick up a light by a knife edge method or a foucault method.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Figure 1:
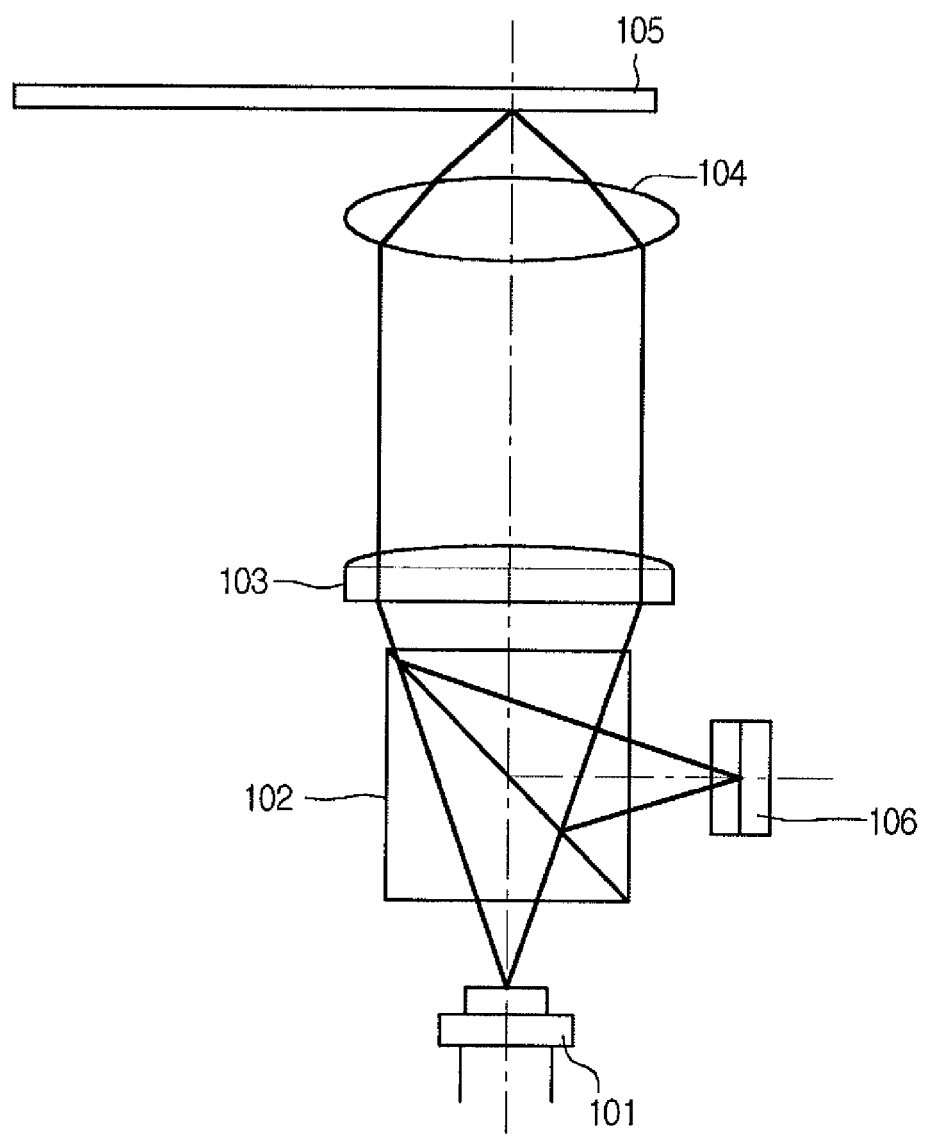
FIG. 1 is a schematic block diagram of a conventional optical pickup device.

Hereinafter, embodiments of the present invention will now be described in detail with reference to the attached drawings. Reference now should be made to the drawings, in which the same reference numerals are used throughout the different drawings to designate the same or similar components. In the following description of the present invention, detailed descriptions may be omitted if it is determined that the detailed descriptions of related well-known functions and construction may make the gist of the present invention unclear.

Figure 3:
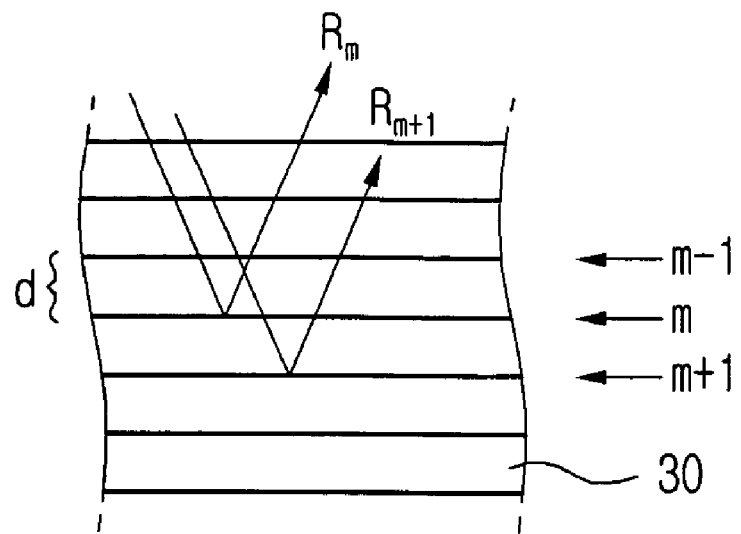
FIG. 3 shows an interlayer interference from the multilayered disk according to the present invention.
Figure 4:
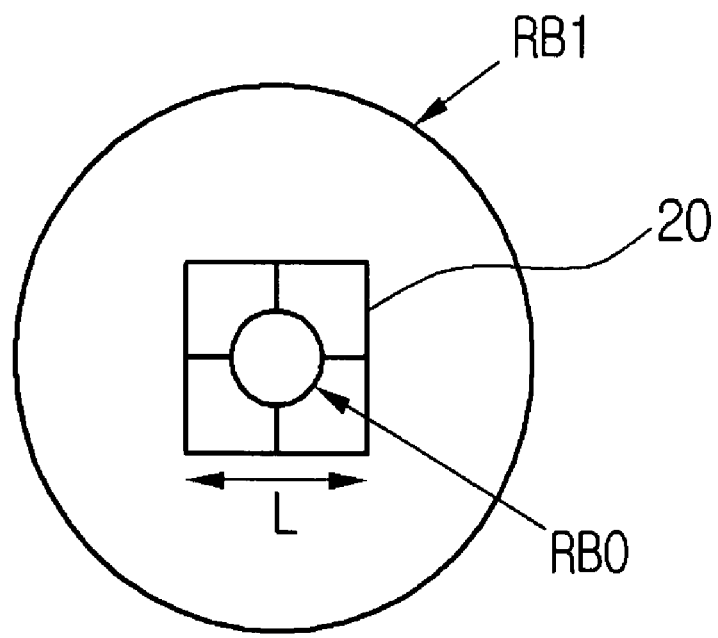
FIG. 4 shows a reflective beam size from a photo detector according to the present invention.

FIG. 3 shows an example of a reflective beam from a multilayered disk from which an interlayer interference is removed according to the present invention, and FIG. 4 shows the shape of a beam received from a photo detector according to the present invention.

Referring to FIGS. 3 and 4, when mth recording layer of the multilayered optical disk 30 in an optical pickup device is recorded or regenerated, the light is reflected on the (m+1)th layer and (m−1)th layer, also. Here, a signal reflected from other layers barely has an effect, thus is excluded from the consideration.

The beam reflected from the mth recording layer is received by the photo detector 20, the light RB0 reflected from the mth recording layer is received in the center of the photo detector and the light RB1 reflected from the (m+1)th recording layer is received in the center of the photo detector with a larger size than the light detected by the photo detector.

Figure 2:
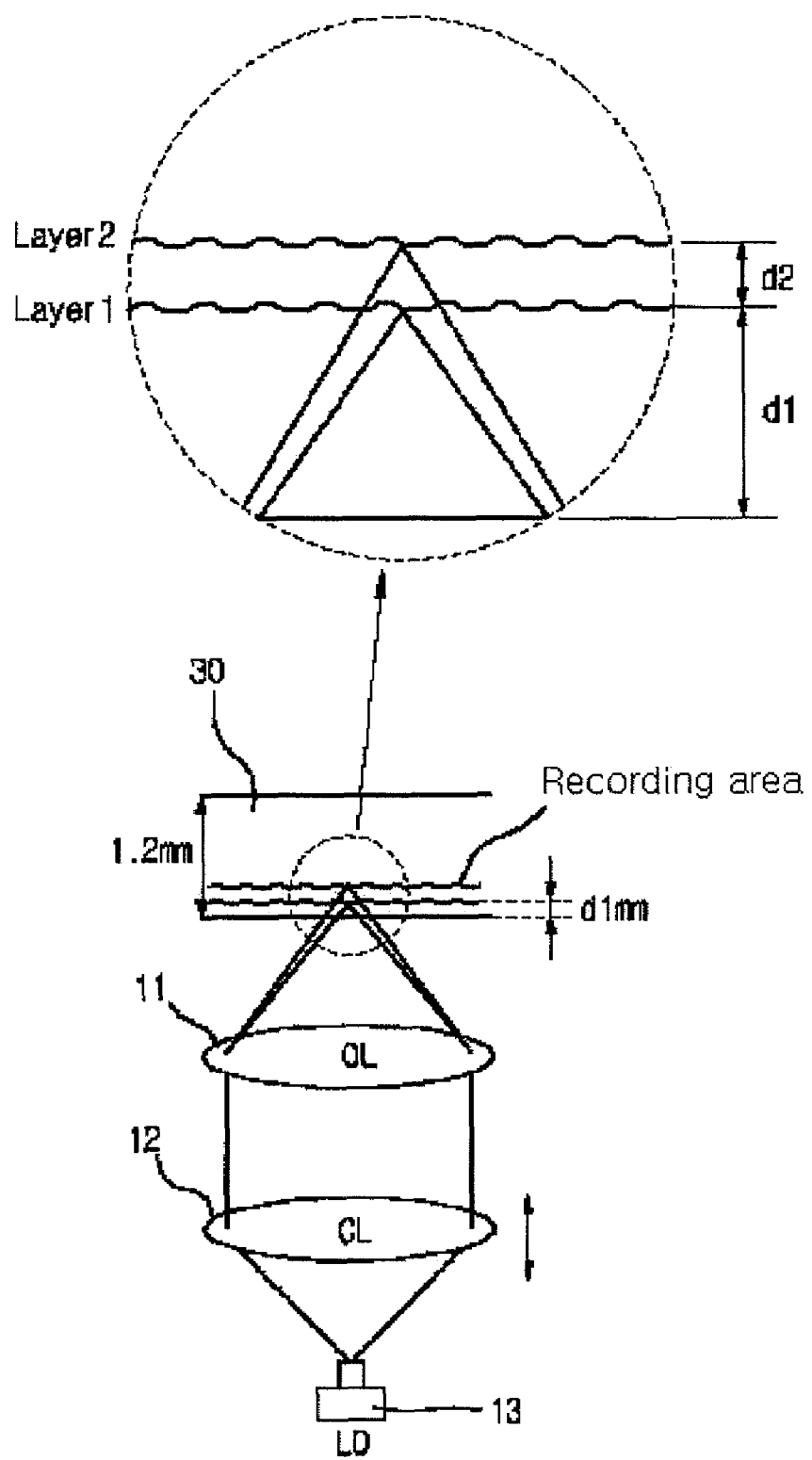
FIG. 2 shows a focusing state of the conventional multilayered disk.

A beam size of the photo detector is as follows. If a reflectivity from the real recording layer m is Rm and an interlayer space of a disk is d, the beam from the photo detector is focused as illustrated in FIG. 2.

At this time, if the beam size is D, a numerical aperture of an object lens is NA, a ratio of a light receiving system is M, a reflective signal range or S-curve range is s, and a detecting size of a photo detector is L, the beam size D of a light reflected from m layer in the photo detector is represented in the following mathematic formula 1.

$$D = s \times NA \times M \times 2 \qquad \text{[Mathematic formula 1]}$$

In addition, the beam size D' of a light reflected from (m+1) or (m−1) layer in the photo detector is represented in the following mathematic formula 2.

$$D' = 2d \times NA \times M \times 2 \qquad \text{[Mathematic formula 2]}$$

The mathematic formula 2 is obtained by applying the value of 2d in consideration of an adjacent layer with respect to a reflective signal range in the mathematic formula 1.

Therefore, a light amount $R_{PD}$ which is reflected from the (m+1) layer and is input to the photo detector is represented in the following mathematic formula 3.

$$R_{PD} = R_{m+1} \frac{L^2}{\pi (4dNAM)^2} \qquad \text{[Mathematic formula 3]}$$

In addition, the proportion P of a noise light reflected from the adjacent layer to the main light reflected to the mth layer is represented in the formula 4 as follows, $$P = \frac{R_{m+1}\frac{L^2}{\pi\{4dNAM\}^2} + R_{m-1}\frac{L^2}{\pi\{4dNAM\}^2}}{R_m}$$

$$= \frac{R_{m+1} + R_{m-1}}{R_m} \frac{L^2 s^2}{4\pi d^2 D^2} \qquad \text{[Mathematic formula 4]}$$

$R = R_{m+1} = R_{m-1}$, and if an interference at the adjacent layer is refrained less than P, a reflective signal range should be limited in the following mathematic formula 5, $$s < \frac{D}{L} d \sqrt{2\pi P} \qquad \text{[Mathematic formula 5]}$$

It is possible to design and manufacture an optical pickup satisfying the mathematic formula 5.

For example, a widely used proportion (D/L) of a photo detector size to a beam size in the photo detector is 0.7, and if the proportion P of a noise light to a main light is less than 1%, there are no difficulties in the capabilities.

Accordingly, if an optical disk is manufactured to have an interlayer space d of 10 μm, the reflective signal range s becomes less than 1.75 (s<1.75 μm). In other words, if the reflective signal range is less than 1.7 μm, an interlayer interference can be refrained below 1%.

The above formulas are obtained under a condition that a focus server is obtained using an astigmatism. If a knife edge method or a fouault method is used, the above formula is changed into the following mathematic formula 6, $$P = \frac{R_{m+1} + R_{m-1}}{Rm} \frac{s^2}{4\pi d^2} \qquad \text{[Mathematic formula 6]}$$

In addition, a reflective signal range is obtained in the mathematic formula 7.

$$s < d\sqrt{2\pi P} \qquad \text{[Mathematic formula 7]}$$

In the above case, in order to make D/L be 0.7 and P be less than 1%, d=10 μm, and s<2.51 μm.

As described above, if an interlayer space d is manufactured to be 10 μm in order to remove an interlayer interference when manufacturing a multilayered disk, a reflective signal range becomes less than 1.7 μm and interlayer interference can be refrained below 1%. At this time, a focus server is detected using an astigmatism method.

The present invention has been described with reference to the preferred embodiments, but it is apprehended that the present invention can be modified and changed in various ways within the spirit and scope of the present invention described in the claims by those skilled in the art.

According to a method for manufacturing a multilayered disk and a method for removing an interlayer interference using the disk in the present invention, it is possible to design and manufacture a multilayered disk within a reflective signal range.

What is claimed is:

1. A method for manufacturing a multilayered disk, the method comprising: forming at least two recording layers in the multilayered disk, wherein a space between the two recoding layers is set to less than 10 μm to refrain from an interference at the adjacent layer when one of the recording layers is recorded or regenerated, and wherein the reflective signal is set to less than $$\frac{D}{L}d\sqrt{2\pi P},$$

D refers to a beam size in a photo detector. L refers to a photo detector size and D/L is set to 0.7, P refers to a ratio of a main light reflected from a layer to access to a noise light reflected from the adjacent layer and is set to less than 1%, and d refers to a space between the recording layers.

2. The method of claim 1, wherein the space between the recording layers of the disk is the same.

3. The method of claim 1, wherein the reflective signal is detected using an astigmatism method that a focus server is used to pick up a light.

4. The method of claim 1, wherein the method for detecting die reflective signal uses a focus server to pick up a light by a knife edge method or a foucault method.

5. The method of claim 4, wherein the reflective signal is set to less than $s<d\sqrt{2\pi P}$, P refers to a ratio of a main light reflected from a layer to access to a noise light reflected from the adjacent layer and is set to less than 1%, and d refers to a space between die recording layers.

6. A recording medium comprising: a multilayered disk having at least two recording layers, wherein a space between the two recoding layers is less than 10 μm to refrain from an interference at the adjacent layer when one of the recording layers is recorded or regenerated, and wherein the reflective signal is set to less than $$\frac{D}{L}d\sqrt{2\pi P},$$

D refers to a beam size in a photo detector. L refers to a photo detector size and D/L is set to 0.7, P refers to a ratio of a main light reflected from a layer to access to a noise light reflected from the adjacent layer and is set to less than 1%, and d refers to a space between the recording layers.

7. The recording medium of claim 6, wherein the space between the recording layers of the disk is the same.

8. The recording medium of claim 6, wherein the reflective signal is detected using an astigmatism method that a focus server is used to pick up a light.

9. The recording medium of claim 6, wherein a method for detecting the reflective signal uses a focus server to pick up a light by a knife edge method or a Foucault method.

10. The recording medium of claim 9, wherein the reflective signal is set to loss than $s<d\sqrt{2\pi P}$, P refers to a ratio of a main light reflected from a layer to access to a noise light reflected from the adjacent layer and is set to less than 1%, and d refers to a space between the recording layers.

11. The method of claim 1, wherein a range of a reflective signal from each of the recording layers of the disk is set to less than 1.7 μm.

12. The recording medium of claim 6, wherein a range of a reflective signal from each of the recording layers of the disk is set to less than 1.7 μm.

* * * * *